United States Patent [19]

Kunikyo

[11] Patent Number: 4,504,945
[45] Date of Patent: Mar. 12, 1985

[54] COMPUTER NETWORK SYSTEM

[75] Inventor: Tomoo Kunikyo, Kawasaki, Japan

[73] Assignee: Agency of Industrial Science and Technology, Tokyo, Japan

[21] Appl. No.: 549,628

[22] Filed: Nov. 7, 1983

Related U.S. Application Data

[63] Continuation-in-part of Ser. No. 252,244, Apr. 8, 1981.

[30] Foreign Application Priority Data

May 30, 1980 [JP] Japan .................................. 55-71521

[51] Int. Cl.³ ............................ H04J 3/02; H04Q 9/00
[52] U.S. Cl. ........................................ 370/88; 370/86; 370/89; 340/825.05
[58] Field of Search .................... 340/825.05, 825.5; 370/85, 86, 87, 88, 89, 95

[56] References Cited

U.S. PATENT DOCUMENTS

| Re. 28,958 | 9/1976 | Zafiropulo et al. | 340/825.05 |
| 3,586,782 | 6/1971 | Thomas | 370/88 |
| 3,652,798 | 3/1972 | McNeilly et al. | 370/88 |
| 3,732,374 | 5/1973 | Rocher et al. | 370/88 |
| 4,241,330 | 12/1980 | Hery et al. | 340/825.05 |
| 4,370,744 | 1/1983 | Hirano et al. | 370/88 |
| 4,380,061 | 4/1983 | Mori et al. | 370/88 |
| 4,416,008 | 11/1983 | Takahashi et al. | 370/88 |
| 4,460,994 | 7/1984 | Scanlon et al. | 370/88 |

Primary Examiner—Gerald L. Brigance

[57] ABSTRACT

Two hairpin networks are provided between two owner stations. A plurality of member stations are connected along the networks for mutual data communication. Each member station has two sets of reception and transmission terminals, one set being connected to one network and the other set to the other network, in reverse of order of connection relative to the two owner stations.

2 Claims, 7 Drawing Figures

FIG.1 PRIOR ART
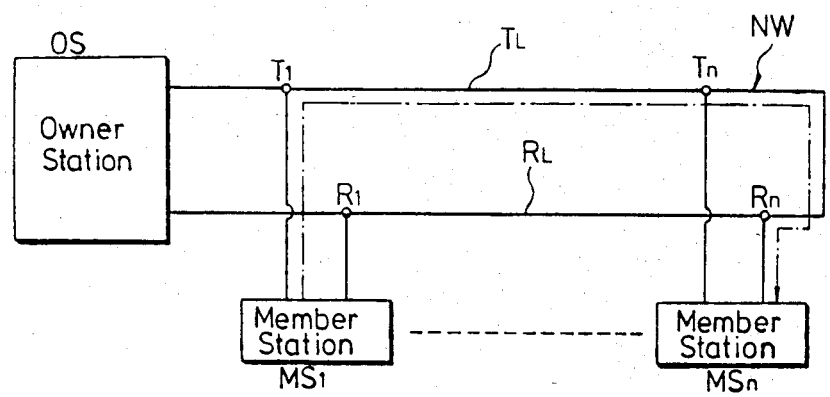
FIG.2
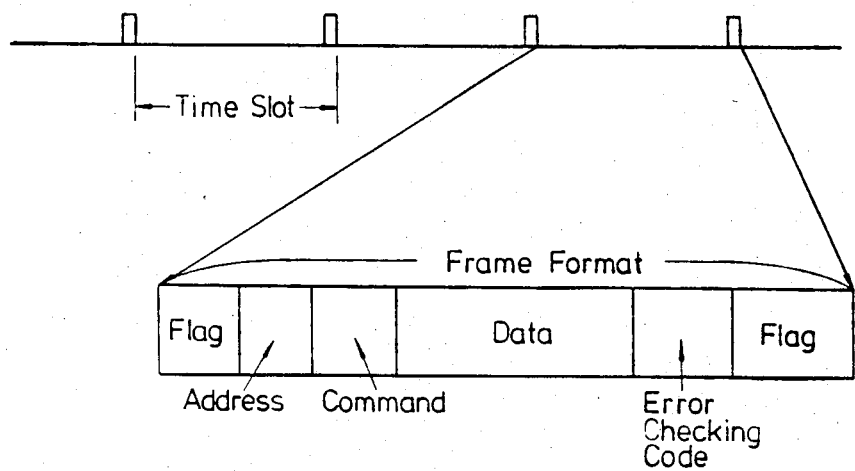
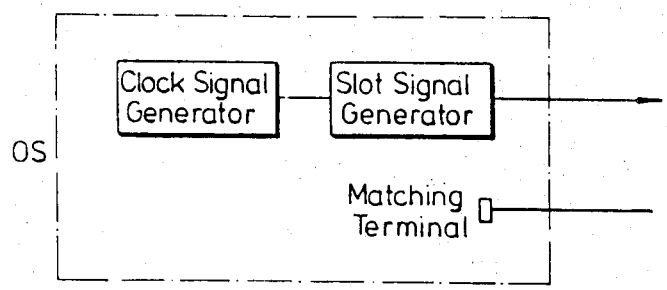
FIG.3

COMPUTER NETWORK SYSTEM

RELATED APPLICATION

The present application is a continuation in part of Ser. No. 252,244 filed Apr. 8, 1981.

FIELD OF THE INVENTION

This invention relates to a computer network system and more particularly to a computer loop network system.

BACKGROUND ART OF THE INVENTION

Hitherto, a loop network system has been widely used for the data communication between two or more computers. The loop network system of this type is generally simple in arrangement, although the data circulating around the network creates an undesired synchronization lag or a great retardation due to synchronization lag correction.

Further, it has been well known to provide a hairpin network in which a loop shape network is provided at an owner station which monitors and controls the transmission operation of the network. The hairpin network of this type generally comprises an owner station OS from which the hairpin network NW extends with two or more member stations $MS_1$ to $MS_n$ connected thereto in a given order and having the transmission terminals $T_1$ to $T_n$ and the reception terminals $R_1$ to $R_n$ respectively connected to a transmission line $T_L$ and a reception line $R_L$ of the hairpin network NW as shown in FIG. 1.

In the network system as described in the foregoing, when data communication between the member stations $MS_1$ and $MS_n$ is to take place, a vacant time slot transmitted from the owner station to the network NW is detected and reserved by a member station $MS_1$. Data is provided by the member station $MS_1$ through the transmission line $T_L$ of the network NW and the data is received by another intended member station for example $MS_n$ by way of the reception line $R_L$. Accordingly, in this system data communication between the member stations is enabled through the owner station OS without causing any undesired problem as is normally seen in other conventional loop network system.

A general data format of the time slot transmitted from the owner station is illustrated in FIG. 2 where a frame of an individual time slot includes an initial flag, an address, a command, a data, an error checking code and an end flag in the given order. The time slot is reserved and written in the initial flag, while the specific member station to which data is to be transmitted is written in the address and the specific data to be transmitted is written in the command.

The owner station OS for transmitting the time slot is generally composed of a clock signal generator and a matching terminal as shown in FIG. 3. The time signal derived from the clock signal generator is transmitted to the slot signal generator to provide a time slot which is in turn transmitted to the transmission line $T_L$. The reception line $R_L$ terminates at the matching terminal. The member station MS for effectuating the transmission as well as the reception with the time slot is generally arranged as shown in FIG. 4. The usual member station MS comprises a computer or a terminal equipment thereof and a buffer through which the data to the transmission line $T_L$ is transmitted by way of a bus detector, a transmission controller and a transmission changer. Data is transmitted to the reception line $R_L$ through the buffer as a function of the reception data as well as an error detector and a reception controller. Further, the bus detector the synchronization with the time slot and detects the vacant time slot is detected.

In the hairpin network of the foregoing type, when data communication between member stations is to take place, a member station must access a vacant transmitted time slot for reservation. A problem arises if access of the vacant time slot is desired by a member station $MS_1$ nearer to the owner station OS than a succeeding member station $MS_n$. The reason is that the writing time for accessing vacant time slot for a succeeding, more distant, member station is increased so that access by the nearer member station is enhanced.

To overcome the disadvantages of the conventional hairpin network, it has been proposed to provide a system ensuring equal access of the vacant time slot for both near and the more distant member stations by reserving the vacant time slot at the transmission terminal and the reception terminal of the member station and by limiting access to vacant time slots at the transmission terminal and at the reception terminal as for example, described in Japanese patent publication No. 54-114903. Namely, according to this conventional allotting system of the vacant time slot the transmission terminals $T_1-T_n$ and the reception terminal $R_1-R_2$ have time slot monitoring functions in individual member stations. For example, in the transmission terminal the vacant time slot frame has a heading bit in the frame of an uneven order which is zero while in the reception terminal the vacant time slot frame has a heading bit in the frame of an even order which is also zero. Accordingly, when a transmission member station has traced a desired vacant time slot, the heating bit of the traced vacant time slot is changed to "1" for reservation, thereby, inhibiting utilization by the other member stations or by the owner station. Thus, when the transmission terminal has located a vacant time slot, the heading bit of the vacant time slot becomes the number "1" enabling simultaneous writing of the identity of the transmission station and that of the reception station as well as the data to be transmitted in the given order. When the vacant time slot has been located at the reception terminal, the heading bit of the vacant time slot is also changed to number "1" which inhibits utilization by the other member stations or the owner station. On the other hand, the reception member station monitors the time slot at the reception terminal and when the time slot for the reception member station has been traced, the transmission terminal of the transmission member station is connected to the reception member terminal of the reception member station through the transmission line for reception of the data from the transmission member station. In the reception member station, when the predetermined data transmission from the transmission member station is completed, the heading bit of the reserved time slot is changed to "0" thus providing a vacant slot which is freed for utilization by the other member stations, the owner station and the like.

However, in the system for allotting a vacant time slot hereinbefore described, the control system for reservation by way the heading bit of the time slot is complicated, lacks reliability for detecting the trouble on transmission line and suffers from other difficulties arising from the single network system for data communication.

The foregoing disadvantages and shortcomings of the conventional hairpin network system have been overcome in accordance with the invention by providing an improved computer network system in which two hairpin networks are disposed between two owner stations, i.e. a station which transmits a vacant time slot, with two or more member stations, i.e. a station for carrying out material data communication arranged in a given order from one owner station to the opposite owner station along the two networks and each member station is provided with two sets of transmission and reception terminals of which one set is connected to the transmission line and reception line of one network and the other set is connected to the transmission line and the reception line of the second network. Namely, in accordance with the invention, each member station is connected to one network with one set of transmission and receiver terminals in the precedent position to one owner station, while the same member station is connected to the other network with its other set of transmission and receiver terminals in a reverse or subordinate position to the other owner station. Hence chances of access of the vacant time slot transmitted independently from the owner station of each network by the member stations are balanced.

SUMMARY OF THE INVENTION

It is, therefore, a general object of the invention to provide a computer network system, particularly a hairpin computer network system for performing data communication between two or more member stations by continuously transmitting a vacant time slot from the owner station whereby equal access of the vacant time slot is ensured by individual member station.

A principal object of the invention is to provide a computer network system in which two hairpin networks are arranged between two owner stations with two or more member stations arranged in seriatim along the double network. Each individual member station is provided with two sets of transmission and reception terminals, one set of which is connected to a transmission line and a reception line of one network whereas the other set of terminals is connected to a transmission line and a reception line of the second network with reverse order of connections in relation to distance from the two owner stations.

In the computer network system according to the invention one set of transmission and reception terminals of each member station is preferably connected to one hairpin network in a predetermined order in relation to distance from one of the owner stations to which the one network is connected whereas the other set of the transmission and reception terminals of each member station is connected to the second network in an order reverse to said predetermined order in relation to distance from the other owner station to which the second network is connected.

Further, a separate vacant time slot is preferably transmitted from each owner station to the network so that each member station may achieve access of the vacant time slot under equivalent conditions.

Other objects and advantages of the invention will be more fully described with reference to the accompanying drawings which is illustrative of preferred embodiments of the invention in which:

BRIEF DESCRIPTION OF THE DRAWINGS

In the drawings:

FIG. 1 is a block diagram illustrative of the conventional hairpin computer network system;

FIG. 2 is a pictorial elevation of the usual data format;

FIG. 3 is a block diagram of the general arrangement of the owner station;

PREFERRED EMBODIMENT OF THE INVENTION

Figure 4:
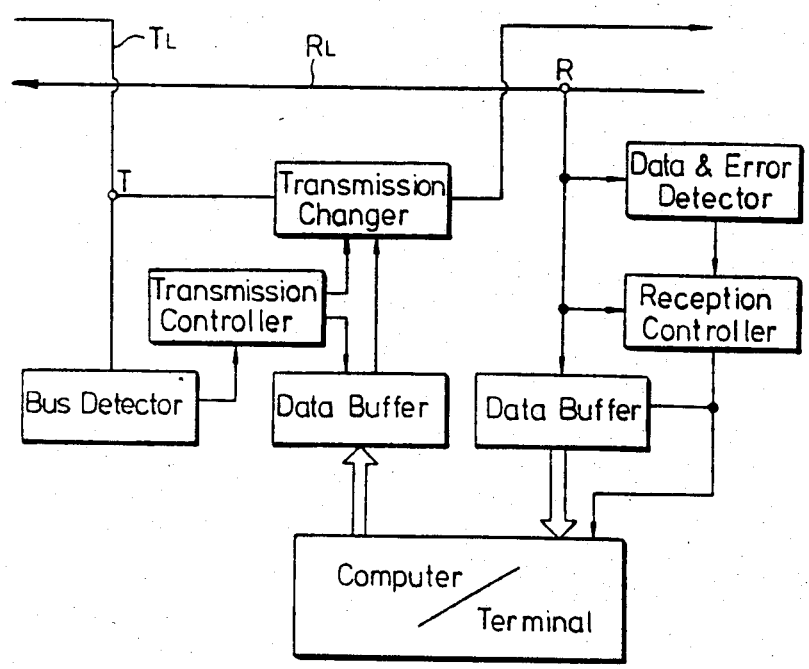
FIG. 4 is a block diagram of the general arrangement of the member station.
Figure 5:
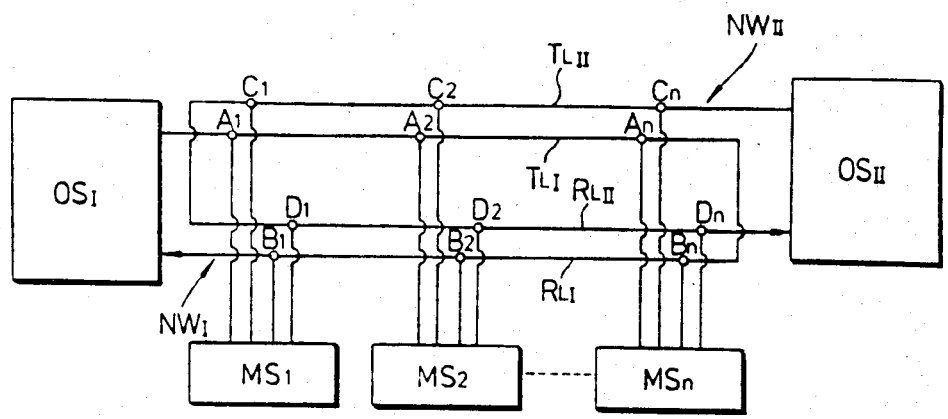
FIG. 5 is a block diagram of the double hairpin computer network system according to the invention.

A typical embodiment of the computer network system according to the invention is shown in FIG. 5 where a first owner station $OS_I$ and a second owner station $OS_{II}$ are arranged separately with separate hairpin networks $NW_I$ and hairpin networks $NW_{II}$. Namely, between the first owner station $OS_I$ and the second owner station $OS_{II}$ there is arranged, symmetrically, a network $NW_I$ and network $NW_{II}$. Along the transmission line $T_{LI}$, $T_{LII}$ and the reception lines $R_{LI}$, $R_{LII}$ of the two networks $NW_1$, $NW_{11}$ there is provided two or more member stations $MS_1, MS_2 \ldots MS_n$ which are computer or terminal equipment of various kinds. Each individual member station is provided with two sets of transmission terminals and reception terminals A, B and C, D respectively connected to transmission lines $T_{LI}$ or $T_{LII}$ and reception lines $R_{LI}$ or $R_{LII}$. For example, the transmission terminal $A_1$ and the reception terminal $B_1$ of the member station $MS_1$ are connected to the network $NW_1$ in the precedent position; i.e. most proximate to the owner station $OS_I$, while the other transmission terminal $C_1$ and reception terminal $D_1$ of the member station $MS_1$ are connected to network $NW_{II}$ in a subordinate position; i.e. most distant from the owner station $OS_{II}$.

Further one set, transmission terminal $A_n$ and reception terminal $B_n$, of the member station $MS_n$ is connected to the network $NW_I$ in a subordinate position; i.e. most distant from the owner station $OS_I$ whereas the other set, transmission terminal $C_n$ and reception terminal $D_n$ of the member station $MS_n$ is connected to the network $NW_{II}$ in a precedent position; i.e. nearest to the owner station $OS_{II}$.

One hairpin network ($NW_I$) is extended at first from a transmission terminal of one owner station ($OS_I$) for connecting transmission terminals ($A_1$-$A_2 \ldots A_n$) of serial member stations ($MS_1$-$MS_n$) through a transmission line ($T_{LI}$) and then returns to a reception terminal of said one owner station ($OS_1$) for connecting reception terminals ($B_n- \ldots B_2$-$B_1$) of said serial member stations ($MS_n$-$MS_1$) through a reception line ($R_{LI}$), as shown in FIG. 5. Similarly, the other hairpin network ($NW_{II}$) is extended at first from a transmission terminal of the other owner station ($OS_{II}$) for connecting transmission terminals ($C_n- \ldots C_2$-$C_1$) of the serial member station ($MS_n$-$MS_1$) through a transmission line ($TL_{II}$) in the reversed order in relation to the hairpin network ($NW_I$) as shown in FIG. 5, and then return to a reception terminal of said other owner station ($OS_{II}$) for connecting reception terminals ($D_1$–$D_2$ ... $D_n$) of said serial member stations ($MS_1$–$MS_n$) through a reception line ($R_{LII}$).

From the foregoing description, it will be appreciated that between the member station $MS_1$ and the member station $MS_n$ two sets of the transmission terminals and reception terminals for the member stations $MS_2$ to $MS_{n-1}$ are connected to the network $NW_I$ in the order of from the precedent position to subordinate position in relation to the owner station $OS_I$ while for the network $NW_{II}$ the transmission and reception terminals for these member stations are ordered from the subordinate position to the precedent position in relation to owner station $OS_{II}$.

In the computer network system thus constituted according to the invention, two or more member station $MS_1$ to $MS_n$ connected to the networks $NW_I$ and $NW_{II}$ between the two owner stations $OS_I$ and $OS_{II}$ may have an equivalent order against one of the owner stations so that each member station may selectively effectuate access of the vacant time slot transmitted from one of the owner stations for reservation thereof and thus the data communication between the desired member stations may take place utilizing the reserved time slot. The frame arrangement of the vacant time slot to be transmitted from each owner station to the network and the number of the member stations to be installed may conveniently be determined according to the intended purpose. Further, access and reservation of the vacant time slot may be selectively carried out by employment of various conventional systems.

As hereinbefore described, in the computer network system according to the present invention since two or more member stations are connected to the networks between the owner stations with reversed order, equal access (no longer preferential as a function of distance from the owner station) of the vacant time slot by each member station is made possible, thus equalizing the possibility of utilization of the vacant time slot by each member station. Thus, undesired utilization of the network by the most proximate member station is positively avoided, with improved efficiency of data collection.

Moreover, in the system according to the invention, should unexpected trouble occur in one network of one of the owner stations, the network of the other owner station may still be used for continuance of data communication, thus affording enhanced reliance. In the computer network system of the invention, the arrangement for ensuring equal access of the vacant time slot is simple yet affords highly reliant data communications so that the system of the invention has wide application to various computer network systems.

Figure 6:
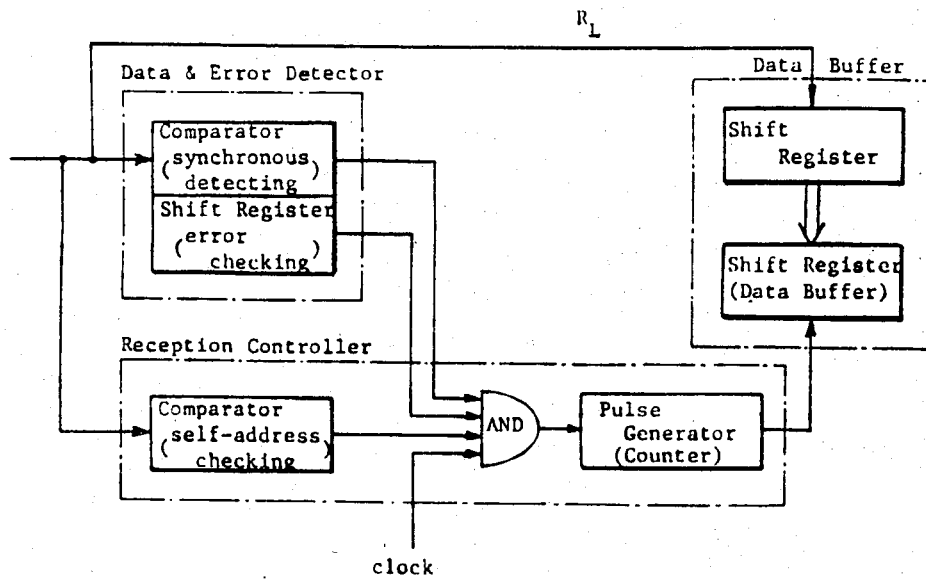
FIG. 6 is a block diagram of the general arrangement of reception controller for a member station.
Figure 7:
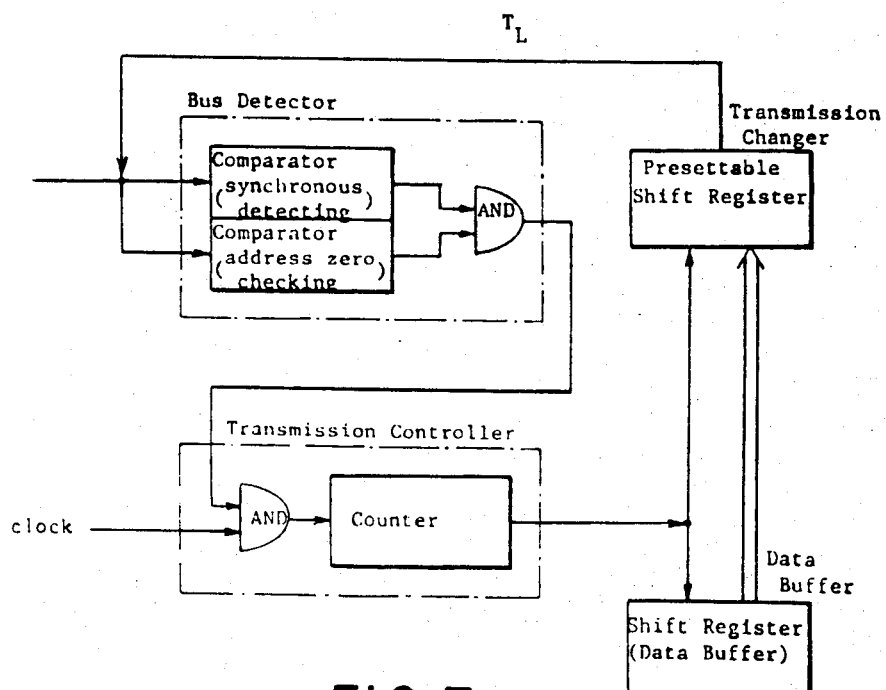
FIG. 7 is a block diagram of the general arrangement of a transmission controller for a member station.

FIGS. 6 and 7 illustrate circuits of conventional controllers which may form the member stations. Detection and retention of a vacant time slot as well as synchronization will be described with respect to these figures.

FIG. 6 illustrates a, reception controller which comprises a comparator 12 for self-address checking of an input signal and an AND circuit for determining an AND condition among the outputs of the comparator, a synchronous detecting signal, an error checking signal and a clock signal. The reception controller is further provided with a pulse generator for counting the output of the AND circuit and to generate a given pulse. From the pulse generator is produced a set pulse for a data buffer comprising two shift registers.

FIG. 7 illustrates a transmission controller which comprises an AND circuit for determining an AND condition between an AND signal obtained from a synchronous detecting signal of an input signal with a vacant time slot (address zero checking) and a clock signal, as well as a counter for counting the output of the AND circuit. Through the counter is produced a set pulse for a data buffer and a transmission changer.

In the frame format according to the present invention as illustrated in FIG. 2, each flag comprises 9 bit zero signals and the section between the flags comprises a unit of 9 bits (= 8 bit data + 1). Thus, the reception and transmission controllers are designed to detect flags and achieve synchronization of signals. Further, an address comprises 8 bit destination address data + 1 and 8 bit source address data + 1. When content of the 8 bit data is zero, a vacant slot is produced. Then, by writing an address data into the vacant slot, designation of a communication and its data communication may be retained.

What is claimed is:

1. A computer network system comprising first and second spacially separated and electrically isolated central stations, each of said central stations having a transmission and a receiving terminal, a continuous closed loop network being provided for each central station, each network at one loop end thereof being connected to the transmission terminal of its associated central station and the other loop end to the receiving terminal of its associated central station, each central station being provided with means for transmitting a vacant time slot and including for this purpose a clock signal generator and a slot signal generator operated under control of signals from said clock generator to produce said vacant time slot for supply to the transmission terminal of the relevant central station, a plurality of member stations, each having two sets of transmission and reception terminals, one set of the transmission and reception terminals of each member station being connected to one of the closed loop networks in series relation and the other set of said transmission and reception terminals of each member station being connected to the other of the closed loop networks in series relation, the series connection of said one set of the transmission and reception terminals to said one of the closed loops being in inverse relation to the series connection of the other set of the transmission and reception terminals to said other of the closed loops in terms of the physical distance of the member stations from the respective central stations, whereby each of the member stations is adapted for equal access to a vacant time slot transmitted by each central station to enable communication between a member station accessing a vacant time slot and a member station addressed thereby.

2. A system according to claim 1, wherein the member stations are connected at their one transmission terminals to a transmission line portion of said one of said closed loop networks in a serially predetermined order and at their one associated reception terminals to a reception line portion of said one of said closed loop networks in an order reverse to that of said predetermined order while said member stations are connected at their other transmission terminals to a transmission line portion of said other of said closed loop networks in an order reverse to that of said serial order to said one transmission terminals and at their associated other reception terminals to a reception line portion of said other of said closed loop networks in a serial order reverse to that of said serial order for said one reception terminals.

* * * * *